United States Patent
Rhiger et al.

(10) Patent No.: US 8,183,537 B1
(45) Date of Patent: May 22, 2012

(54) NEUTRON DETECTION SYSTEM

(75) Inventors: David R. Rhiger, Santa Barbara, CA (US); Bernard Harris, Waltham, MA (US)

(73) Assignee: Raytheon Company, Waltham, MA (US)

( * ) Notice: Subject to any disclaimer, the term of this patent is extended or adjusted under 35 U.S.C. 154(b) by 153 days.

(21) Appl. No.: 12/455,383

(22) Filed: Jun. 1, 2009

Related U.S. Application Data (60) Provisional application No. 61/130,527, filed on May 30, 2008.

(51) Int. Cl.
*H01L 39/00* (2006.01)
(52) U.S. Cl. .............. 250/391; 250/390.07; 250/336.1; 250/358.1
(58) Field of Classification Search ............. 250/390.01, 250/370.05, 518.1
See application file for complete search history.

(56) References Cited

U.S. PATENT DOCUMENTS

| | | | | |
|---|---|---|---|---|
| 5,578,830 A * | 11/1996 | Olsher et al. | ............ | 250/390.03 |
| 6,144,030 A * | 11/2000 | Ray et al. | ................... | 250/338.4 |
| 6,229,144 B1 * | 5/2001 | Ouvrier-Buffet et al. | . | 250/338.4 |
| 7,141,804 B1 * | 11/2006 | Akselrod et al. | ........... | 250/483.1 |
| 2003/0001094 A1 * | 1/2003 | Katagiri et al. | ............ | 250/336.2 |
| 2005/0205786 A1 * | 9/2005 | Katagiri et al. | ............ | 250/336.2 |

OTHER PUBLICATIONS

Silver et al.,Optimization of a 6LiF bolometric neutron detector, 2002, Nuclear Insturuments and Methods in Physics Reasearch , 485, 615-123.*

* cited by examiner

*Primary Examiner* — David Porta
*Assistant Examiner* — Djura Malevic
(74) *Attorney, Agent, or Firm* — Cantor Colburn LLP (57) ABSTRACT

A neutron detector system including a neutron sensitive reaction layer may be configured to react with incident neutrons to form energetic particles. An energetic particle capturing layer may be configured to capture energetic particles emitted from the neutron sensitive reaction layer and convert the kinetic energy of the captured energetic particles to heat. A microbolometer sensing element responsive to the heat may be configured to detect the incident neutrons.

20 Claims, 7 Drawing Sheets

| 100 | 100 | 100 | 100 | 100 | 100 | 100 |
|---|---|---|---|---|---|---|
| 100 | 100 | 100 | 100 | 100 | 100 | 100 |
| 100 | 100 | 100 | 100 | 100 | 100 | 100 |
| 100 | 100 | 100 | 100 | 100 | 100 | 100 |
| 100 | 100 | 100 | 100 | 100 | 100 | 100 |

| 100 | 100 | 100 | 100 | 100' | 100 | 100' |
|---|---|---|---|---|---|---|
| 100 | 100' | 100 | 100' | 100 | 100 | 100' |
| 100' | 100 | 100 | 100 | 100 | 100 | 100 |
| 100 | 100' | 100 | 100' | 100 | 100 | 100 |
| 100 | 100 | 100' | 100 | 100' | 100 | 100 |

NEUTRON DETECTION SYSTEM

RELATED APPLICATIONS

This application hereby claims the benefit of and priority to U.S. Provisional Patent Application Ser. No. 61/130,527, filed on May 30, 2008 under 35 U.S.C. §§119, 120, 363, 365, and 37 C.F.R. §1.55, 1.7(b), and §1.78, incorporated by reference herein.

FIELD OF THE INVENTION

The subject invention relates to an improved neutron detector system.

BACKGROUND OF THE INVENTION

Neutron detectors may be used to monitor radioactive sources that emit neutrons, for medical imaging, neutron radiography, and to provide high resolution images.

One conventional neutron detector system utilizes a device known as a Schottky barrier. The Schottky barrier includes a metal layer on a gallium arsenide (GaAs) semiconductor material and a neutron sensitive surface layer, such as $^{10}$B. A negative voltage applied at a first metal contact sets up the Schottky barrier. The combination of the negative voltage at the first metal contact and positive voltage applied at a second metal contact creates an electric field in the GaAs material which results in an active GaAs region. Incident neutrons react with neutron absorbing atoms in the neutron sensitive surface layer (e.g., $^{10}$B) to form energetic particles (e.g., alpha ($^4$He) and $^7$Li). One of the charged particles from the reaction will penetrate through the neutron sensitive surface layer and the Schottky barrier and enter the active region of the GaAs semiconductor. In the active GaAs active region, the energetic particle which has entered the region gives up some of its energy to form electron hole pairs. These charged carriers (the electrons and the holes) then move in the electric field and create a current pulse which appears in an external circuit to provide for detection of neutrons.

Another conventional neutron detector system utilizes a microchannel plate made of glass doped with $^{10}$B. The microchannels are aligned normal to the surface of the plate and include a high resistance material. A high voltage is applied between the two faces of the plate. Incoming neutrons react with the $^{10}$B in the solid bulk of glass of the plate and generate energetic particles. The energetic particles travel through the bulk of the solid glass and hit the lining of various microchannels to generate electrons. The electrons emitted from the wall of each microchannel then hit the opposite walls of that channel to generate more electrons, which similarly hit opposite walls, and so forth, resulting in an avalanche of electrons in that microchannel. The avalanche of electrons emitted from various microchannels is each detected as a pulse by a detector, such as a cross-finger anode board. This provides information as to where and when the pulse emitted from the microchannel plate to provide for detection of neutrons.

SUMMARY OF THE INVENTION

In one aspect, a neutron detector system is featured including a neutron sensitive reaction layer configured to react with incident neutrons to form energetic particles. An energetic particle capturing layer may be configured to capture energetic particles emitted from the neutron sensitive reaction layer and convert the kinetic energy of the captured energetic particles to heat. A microbolometer sensing element responsive to the heat may be configured to detect the incident neutrons.

A neutron detector system is featured, in one aspect, which improves the efficiency of some conventional neutron detectors which utilizes a Schottky barrier having a neutron sensitive surface layer of a limited thickness which may reduce sensitivity and accuracy.

A neutron detector system is featured which, in one embodiment, improves the sensitivity and accuracy of some conventional neutron detectors in which not all of the resulting energetic particles from the neutron capture reaction in the solid bulk glass of the plate will travel a sufficient distance to reach one of the microchannels and therefore go undetected or neutrons which are aligned parallel with the microchannels pass right through the microchannels and go undetected.

In one embodiment, the neutron sensitive reaction layer may include neutron absorbing atoms. The neutron absorbing atoms may react with incident neutrons having low energy. The neutron absorbing atoms may be configured to include $^{10}$B or $^6$Li. The neutron absorbing atoms may be configured to react with incident neutrons having high energy. The neutron absorbing atoms may include $^9$Be. The energetic particle capturing layer may include a heavy element capable of capturing most of the energetic particles emitted from the neutron sensitive reaction layer. The microbolometer sensing element may include a bridge supported by legs, the bridge having the neutron sensitive reaction layer and energetic particle capturing layer disposed thereon. The bridge may include a thin vanadium oxide layer sandwiched between silicon nitride layers. The combined thickness of the neutron sensitive reaction layer, the energetic particle capturing layer, the thin vanadium oxide layer, and the silicon nitride layers may be greater than a projected range of the energetic particles emitted from the neutron sensitive reaction layer. The heat generated by the energetic particle capturing layer may raise the temperature of the bridge which may decrease the resistance of the vanadium oxide layer and readout circuitry coupled to the legs may measure the change of the resistivity in the vanadium oxide layer to detect the incident neutrons. The system may include an array of microbolometer sensing elements each having the neutron sensitive reaction layer and the energetic particle capturing layer thereon. The system may include an array of microbolometer sensing elements each having the neutron sensitive reaction layer and the energetic particle capturing layer thereon wherein some of the neutron sensitive reaction layers may include neutron absorbing atoms for reacting with incident neutrons having low energy and other neutron sensitive reaction layers may include neutron absorbing atoms for reacting with incident neutrons having high energy.

In another aspect, a method of making a neutron detector system is featured including providing a microbolometer sensing element having a bridge supported by legs, disposing an energetic particle capturing layer over the bridge, and disposing a neutron sensitive reaction layer over the energetic particle capturing layer.

In one embodiment, the method may include the step of selecting a material for energetic particle capturing layer which reacts with the incident neutrons to form energetic particles. The method may include the step of selecting a material for the neutron sensitive reaction layer which captures energetic particles emitted from the energetic particle capturing layer and converts the kinetic energy of the captured energetic particles to heat. The method may include the step of making an array of microbolometer sensing elements each having the neutron sensitive reaction layer and the energetic particle capturing layer thereon. The method may include the step of making an array of microbolometer sensing elements each having the neutron sensitive reaction layer and the energetic particle capturing layer thereon wherein some of the neutron sensitive reaction layers are selected to include neutron absorbing atoms for reacting with incident neutrons having low energy and other neutron sensitive reaction layers are selected to include neutron absorbing atoms for reacting with incident neutrons having high energy.

In yet another aspect, a method for detecting neutrons is featured including reacting incident neutrons with a neutron sensitive reaction layer to form energetic particles, capturing energetic particles emitted from the neutron sensitive reaction layer and converting the kinetic energy of the captured energetic particles to heat, and detecting the incident neutrons using the heat.

Additional features and advantages of the invention will become apparent to those skilled in the art upon consideration of the following detailed description of the illustrated embodiment exemplifying the best mode of carrying out the invention as presently perceived.

BRIEF DESCRIPTION OF THE SEVERAL VIEWS OF THE DRAWINGS

Other features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the Background section above, neutron detectors are used to detect neutrons emitted from various sources. One common neutron capture reaction used in neutron detection is $^{10}B(n,\alpha)^7Li$, which is also written as (1)

In this reaction, the neutron, n, is absorbed by the $^{10}B$ nucleus. The reaction products are an alpha particle ($^4$He nucleus) and the $^7$Li nucleus, both of which are often referred to as energetic particles. The total energy released, Q, for the reaction is about 2.310 MeV (94%). The two energetic particles must emerge in opposite directions due to momentum conservation, but the orientation of the energetic particles is random. Reaction (1) above is convenient for neutron detection because of the very large cross section of $^{10}B$ for thermal neutrons and because the energies of the final particles, e.g., about 1.470 MeV for the alpha particle and about 0.840 MeV for the $^7$Li particle, are in a range that is suitable for detection. The natural isotopic abundance of $^{10}B$ is about 19.80%.

An alternative reaction is $^6Li(n,\alpha)^3H$, where the neutron is absorbed by a $^6$Li nucleus releasing an alpha particle at about 2.05 MeV and a $^3$H nucleus at about 2.73 MeV. See e.g., "Radiation Detection and Measurement". Knoll, G. F., John Wiley & Sons, New York, Chapter 14 (1989), incorporated by reference herein. Similar as discussed above, energetic particles emerge in opposite directions with random orientation. In this reaction, Q, is equal to about 4.78 MeV. The natural isotopic abundance of $^6$Li is about 7.42%.

A typical IR microbolometer is used for infrared imaging. See. e.g., U.S. Pat. No. 6,144,030 to Ray et. al., incorporated by reference herein. A typically IR microbolometer includes a large number of sensing elements which are formed in an array. The array is placed at the focal plane of an IR optical system. The IR flux varies across the focal plane depending on the scene being imaged. Each sensing element produces an electrical signal representing the incident IR flux on that element. By reading out the signals and displaying them in order, IR images can be generated.

The fabrication of an IR microbolometer typically begins with the formation of the readout circuitry on a silicon wafer. The wafer is diced into chips (or dies), each of which consists of an array of unit cells. Each unit cell is capable of driving one IR sensing element. These unit cells, together with support circuitry at the edges of the chip, are designed to perform the signal readout functions. Before dicing the wafer, a microbolometer sensing element is formed on top of each unit cell with electrical and mechanical connections to the silicon. The sensing element in each unit cell consists of a bridge supported by two legs. Each sensing element corresponds to one pixel of the output image. Array formats are as large as 640×480 pixels, or higher. Unit cells are typically square with center-to-center spacing of typically 17 or 25 or 50 μm.

Figure 1:
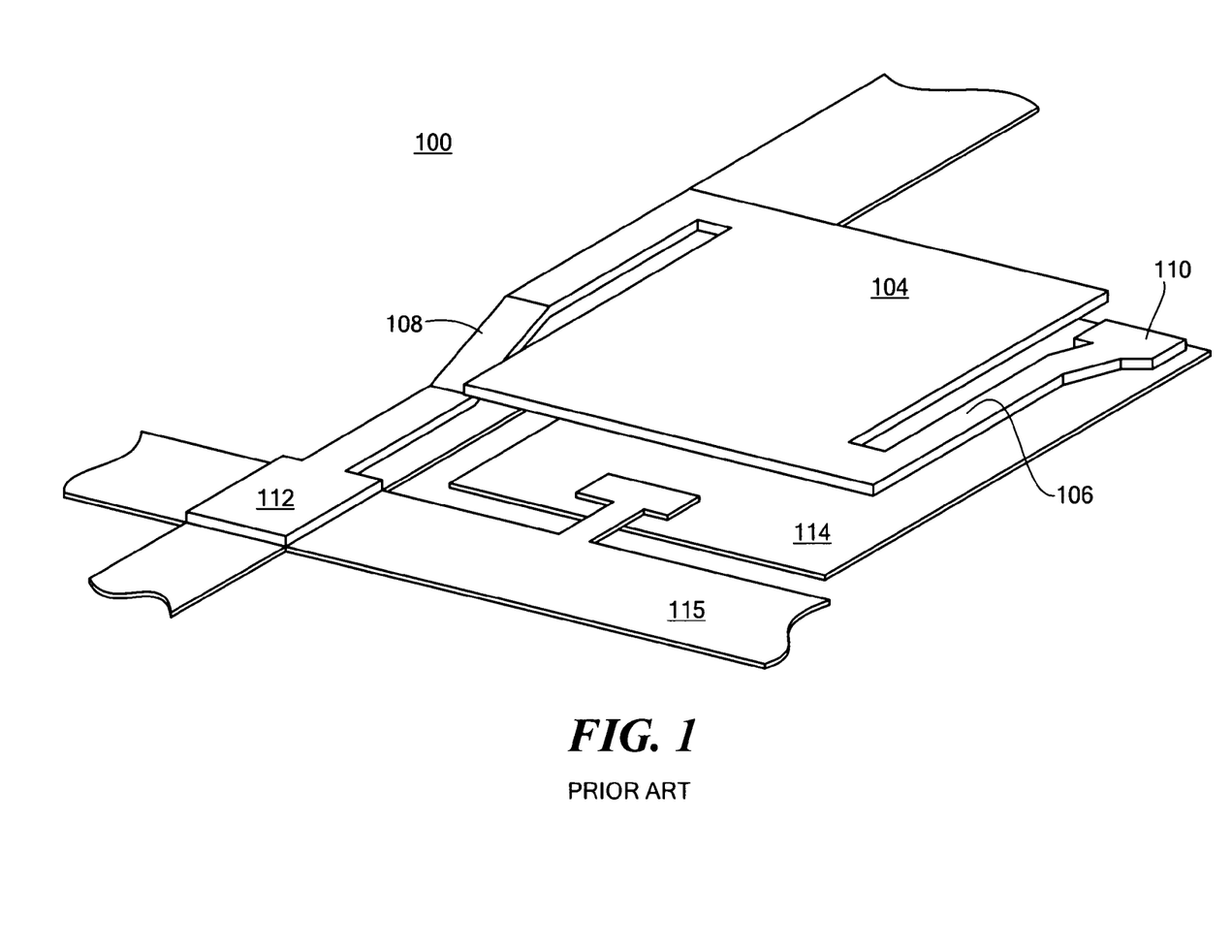
FIG. 1 is a three-dimensional side view of a typical conventional infrared microbolometer sensing element.
Figure 2:
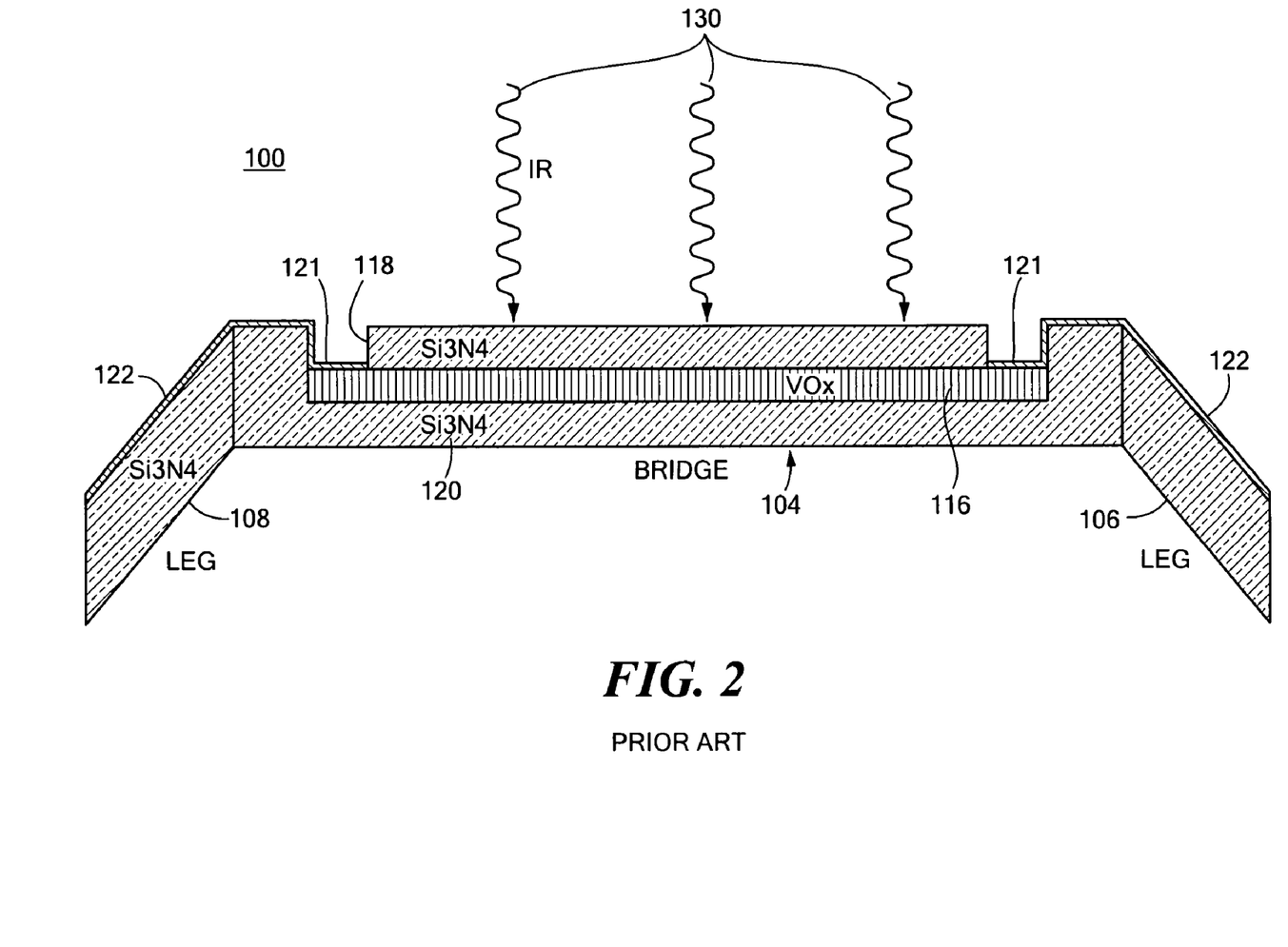
FIG. 2 is a cross-sectional view showing in further detail the structure of the primary components of the microbolometer sensing element shown in FIG. 1.

FIG. 1 shows an example of a conventional microbolometer sensing element 100 which includes bridge 104 supported by legs 106 and 108. Legs 106 and 108 are coupled to connectors 110 and 112, respectively, which are connected to readout circuitry 114 by leads 115. Bridge 104, FIG. 2, where like parts have been given like numbers, is typically composed of thin layer 116 made of vanadium oxide (VOx) sandwiched between silicon nitride ($Si_3N_4$) layer 118 and $Si_3N_4$ layer 120. Thin metal film 122 is disposed on legs 106 and 108 and contacts $VO_x$ layer 116, indicated at 121.

In operation, an increase in IR flux 130 increases the temperature of bridge 104 and reduces the resistively of $VO_x$ layer 116. The mechanism of IR sensitivity of microbolometer sensing element 100 relies on the strong temperature dependence of the resistively of $VO_x$ layer 116. The change in resistance of the $VO_x$ layer 116 is sensed by the readout circuitry 114, FIG. 1, by using a known current driven through the bridge 104. The change in resistivity of $VO_x$ layer 116, FIG. 2, indicates how much IR flux 130 has been absorbed by bridge 104. This may be done for each pixel, or unit cell, made of microbolometer sensing element 100, in the array to provide for good IR imaging. $Si_3N_4$ layers 118 and 120 absorb IR flux 130 and provide structure to support bridge 104.

IR microbolometer with sensing element 100 typically may not be utilized to detect neutrons because they do not react with any of the materials in sensing element 100. Neutron detector system 200, FIG. 3, where like parts have been given like numbers, of this invention includes microbolometer sensing element 100 with bridge 104 supported by legs 106 and 108, connectors 110 and 112, leads 115 and readout circuitry 114, similar as discussed above with reference to FIGS. 1 and 2. Bridge 104, FIG. 4, where like parts have been given like numbers, is similarly composed of thin layer 116 of vanadium oxide (VOx) sandwiched between silicon nitride ($Si_3N_4$) layer 118 of and $Si_3N_4$ layer 120. Thin metal film 122 is disposed on legs 106 and 108 and contacts $VO_x$ layer 116, indicated at 121.

Figure 3:
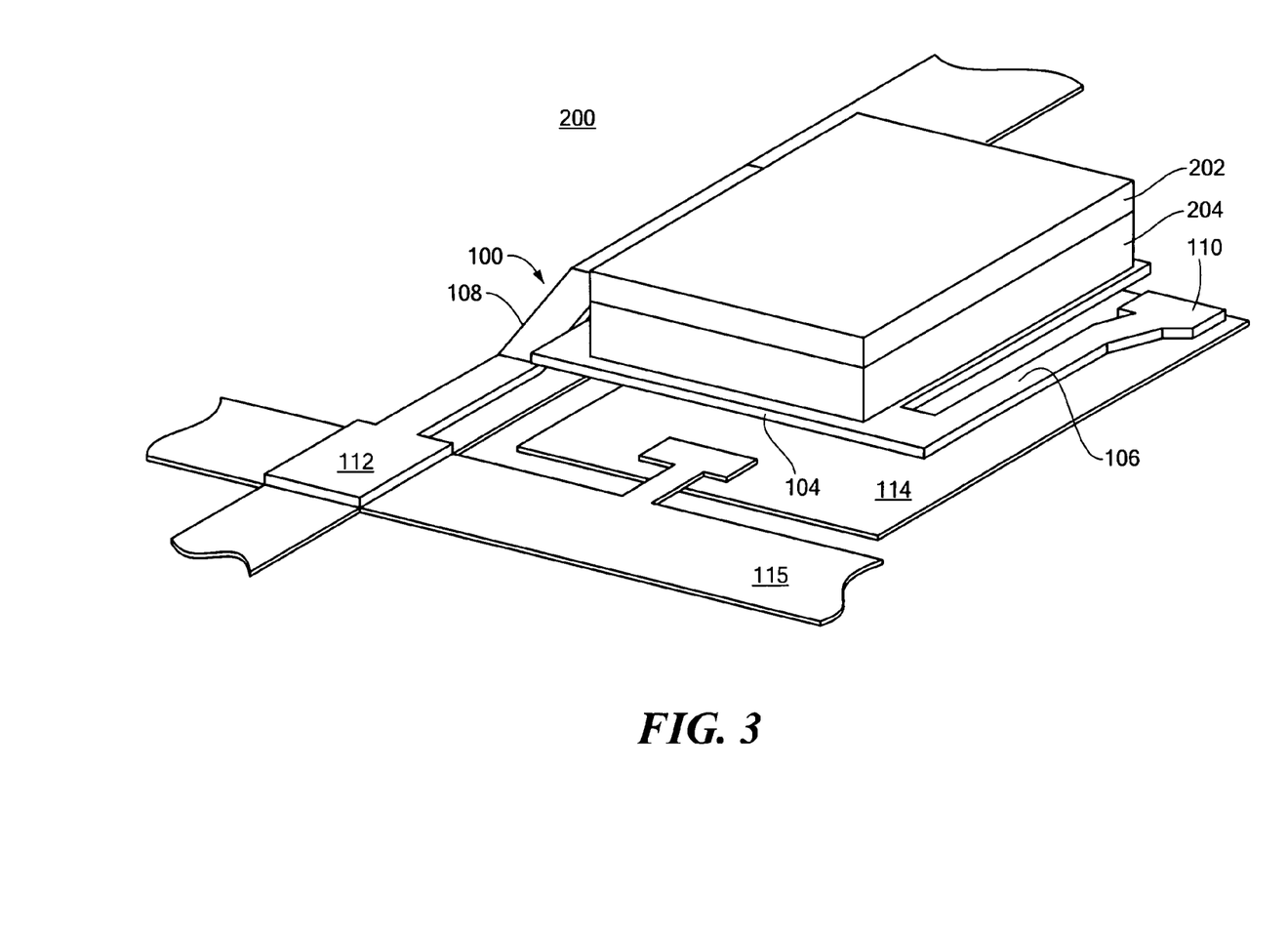
FIG. 3 is a three-dimensional side view one embodiment of the neutron detector system of this invention.
Figure 4:
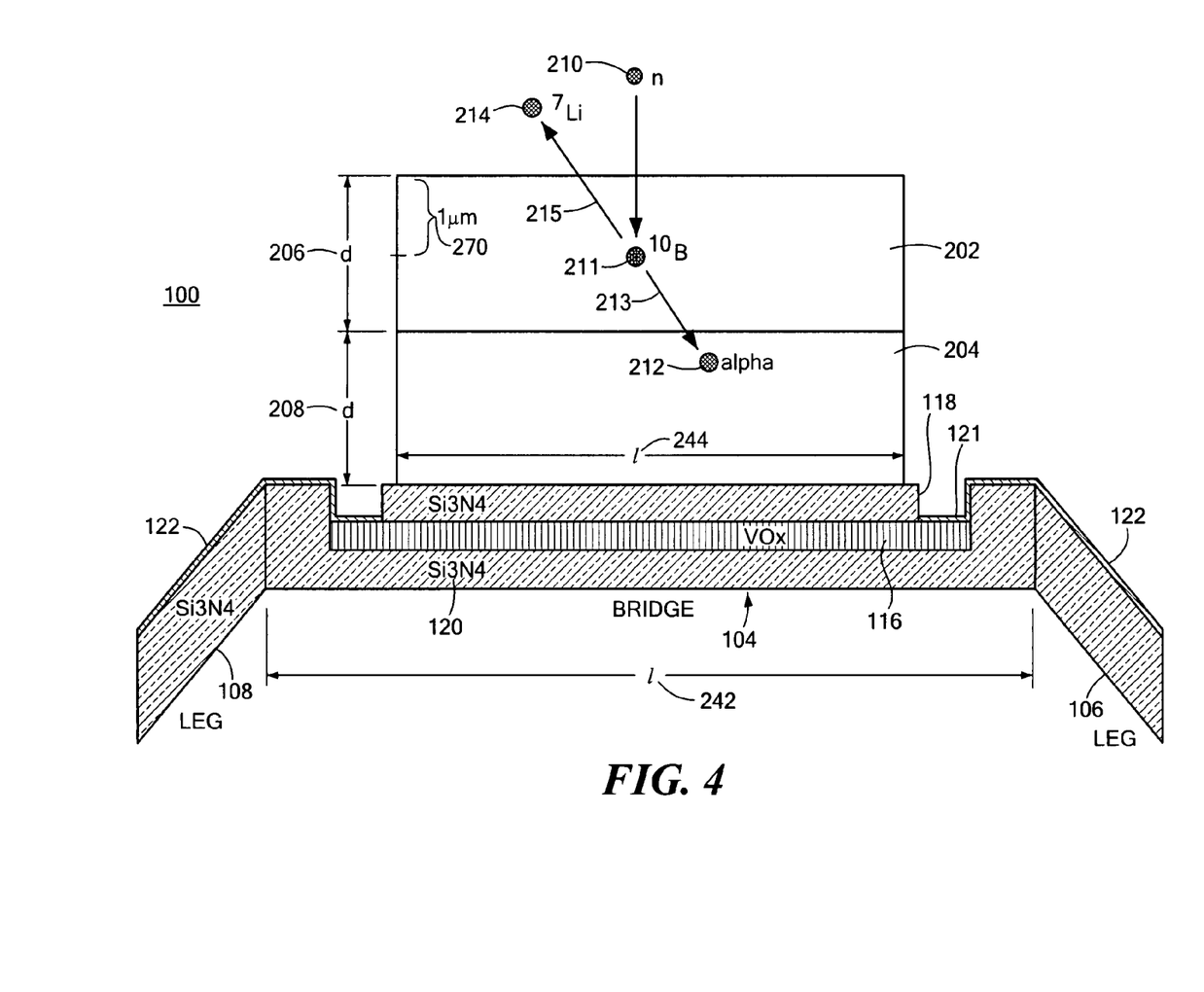
FIG. 4 is a cross-sectional view showing in further detail the structure of the primary components of the neutron detector system shown in FIG. 3.

Neutron detection system 200, FIGS. 3 and 4, of this invention further includes neutron sensitive reaction layer 202 and energetic particle capturing layer 204 disposed over bridge 104. Neutron sensitive reaction layer 202 reacts with incident neutrons to form energetic particles (e.g., alpha and $^7Li$). Energetic particle capturing layer 204 captures energetic particles emitted from neutron sensitive reaction layer 202 and converts the kinetic energy of the energetic particles that enter it into heat, discussed in further detail below.

Neutron sensitive reaction layer 202 is preferably made of a neutron absorbing atoms, such as $^{10}B$, $^6Li$, or similar type neutron capturing atoms known by those skilled in the art. Energetic particle capturing layer 204 is preferably made of gold (Au). However, in other examples, energetic particle capturing layer 204 may be made of any heavy element that can capture most the energetic particles emitted from neutron sensitive reaction layer 202, e.g., platinum, thallium, lead, and bismuth, palladium, silver, indium, tin, and the like. Gold was chosen because of its ease of deposition and low stress when formed as a film.

The combined structure of bridge 104, FIG. 4, with neutron sensitive reaction layer 202, energetic particle capturing layer 204, and $Si_3N_4$ layers 118, 120 and VOx layer 116 needs to be thick enough to stop or capture most of the energetic particles emitted from neutron sensitive reaction layer 202.

In one example, neutron sensitive reaction layer 202 is about 2 μm, indicated at d-206, energetic particle capturing layer 204 is about 1.5 μm thick, indicated at d-208, $Si_3N_4$ layers 118, 120 have a combined thickness of about 1.0 μm, and VOx layer 116 is about 0.05 μm thick. In other designs, the thickness range of neutron sensitive layer 202 and energetic particle capturing layer 204 may each be in the range of about 0.5 μm to about 3.0 μm. The thickness for neutron sensitive reaction layer 202 and energetic particle capturing layer 204 is subject to engineering tradeoffs, which are discussed in further detail below.

Figure 7:
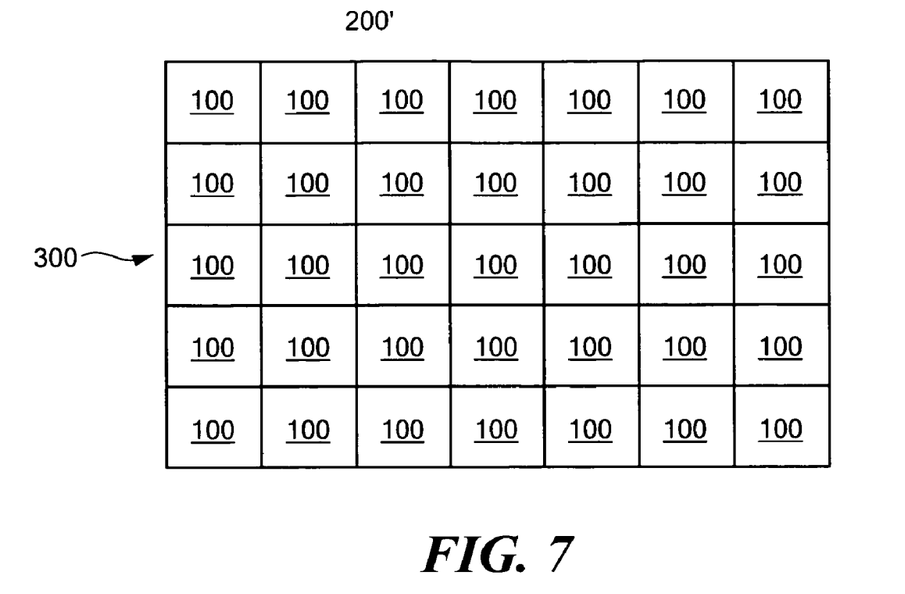
FIG. 7 is a schematic top view of one embodiment of an array of microbolometer sensing elements having the neutron sensitive reaction layer and the energetic particle capturing layer shown in FIGS. 3 and 4.

In a typical design, neutron detector system 200', FIG. 7, includes array of microbolometer sensing elements 100, FIGS. 3 and 4, or unit cells, each having neutron sensitive reaction layer 202 and energetic particle capturing layer 204 disposed thereon, e.g., array 300, FIG. 7. Each microbolometer sensing element 100 with neutron sensitive reaction layer 202 and energetic particle capturing layer 204 preferably corresponds to one pixel of the output image. The array may include about 640×480 pixels, although the array may include more or less than 640×480 pixels as needed. Each microbolometer sensing element 100, or unit cell, with layer 202 and layer 204 of neutron detector system 200 is typically square with center-to-center spacing of typically 17 or 25 or 50 μm. In one example, bridge 104 has a length of about 17 μm, indicated at 1-242 and neutron sensitive reaction layer 202 and energetic particle capturing layer 204 will each have a length of about 14 μm, indicated at 1-244, which covers about 80% of bridge 104.

The neutron detector system of preferably, some embodiments, is typically not placed in the focal plane of an IR imaging system. Instead, the neutron detector system is preferably enclosed in an opaque box made of aluminum, or similar type material which has uniform temperature characteristics. The box prevents the array of the microbolometer from experiencing any spatial or temporal variations in the infrared flux. This prevents any thermal contribution to the signals, other than conventional thermal noise.

In operation, when an incident neutron, e.g., neutron 210, collides with a neutron absorbing atom, e.g., $^{10}B$ atom 211, in neutron sensitive reaction layer 202, the resulting reaction produces two energetic particles that travel in random but opposite directions, e.g., alpha particle 212 and $^7Li$ particle 214, in directions 213 and 215, respectively. Most of the time, at least one of the energetic particles of the reaction will travel in the direction of energetic particle capturing layer 204, e.g., alpha particle 212. The function of energetic particle capturing layer 204 is to capture, or stop, most of the energetic particles that enters it and converts the kinetic energy of those energetic particles to heat. This raises the temperature of bridge 104 and reduces the resistance of $VO_x$ layer 116. The change is resistance of VOx layer 116 is detected by readout circuitry 114, FIG. 3, in a similar manner as microbolometer sensing element 100, discussed above with reference to FIG. 2, to effectively detect neutrons.

Although as discussed above with reference to FIG. 4, alpha particle 212 was emitted into energy particle capturing layer 204, this was done for illustration purposes only, as the $^7Li$ energetic particles may just as likely enter energetic particle capturing layer 204 to provide for detecting neutrons, as discussed above.

Table 1 below shows one example of the projected ranges of $^7Li$ and alpha ($^4He$) energetic particles, or ions, produced in neutron sensitive reaction layer 202 made of $^{10}B$ and having a thickness of about 2 μm, energetic particle capturing layer 204 made of gold (Au) and having a thickness of about 1.5 μm thick, $Si_3N_4$ layers 118, 120 have a combined thickness of about 1.0 μm, and $VO_x$ layer 116 having a thickness of about 0.05 μm. The values in Table 1 may be calculated using Stopping and Range of Ions in Matter (SRIM) software.

TABLE 1

Projected ranges of energetic particles.

| | Material | $^7Li$ at 0.84 MeV | α ($^4He$ ion) at 1.47 MeV |
|---|---|---|---|
| Neutron sensitive reaction layer | B | 1.83 μm | 3.53 μm |
| Energetic particle capturing layer | Au | 1.07 μm | 2.13 μm |
| $VO_x$ | $Si_3N_4$ | 1.63 μm | 2.39 μm |

In this example, the combined thickness of neutron sensitive reactor layer 202, energetic particle capturing layer 204 and $Si_3N_4$ layers 118, 120 is equal to about 4.5 μm. As shown in Table 1, this thickness is greater than the projected ranges of the $^7Li$ and alpha ($^4He$) energetic particles.

Figure 5:
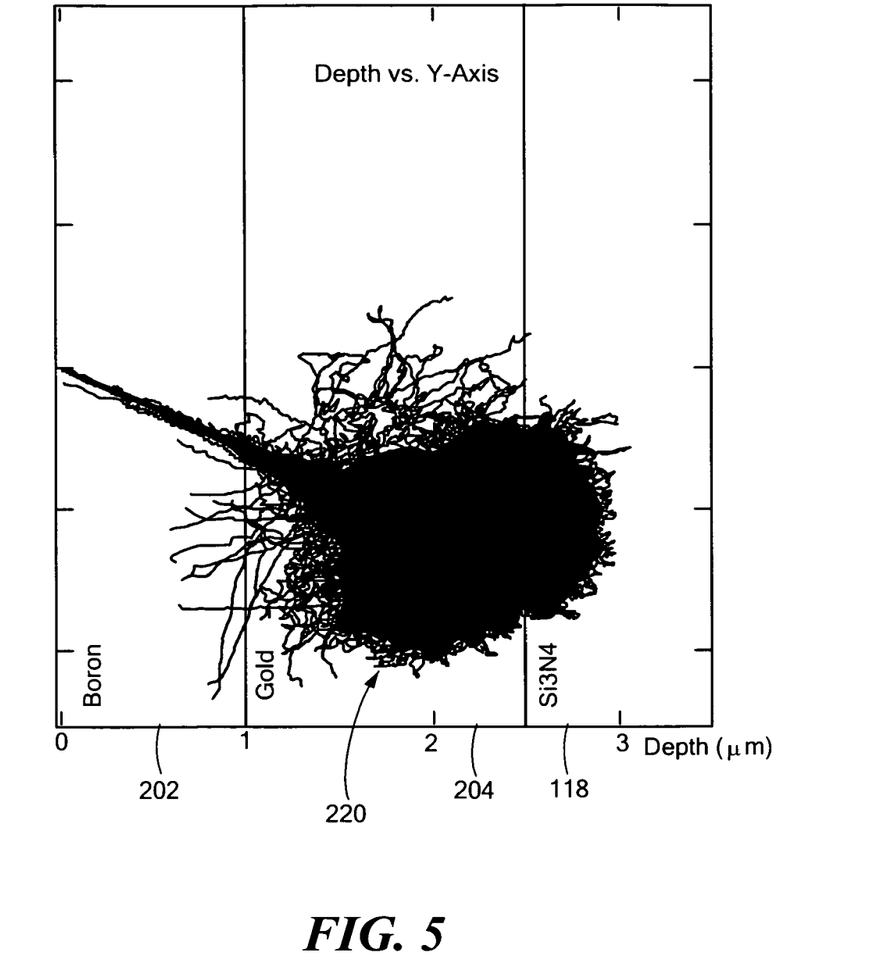
FIG. 5 is a graph showing an example of the trajectory of alpha particles passing through the various layers of the neutron detector system shown in FIGS. 3 and 4.
Figure 6:
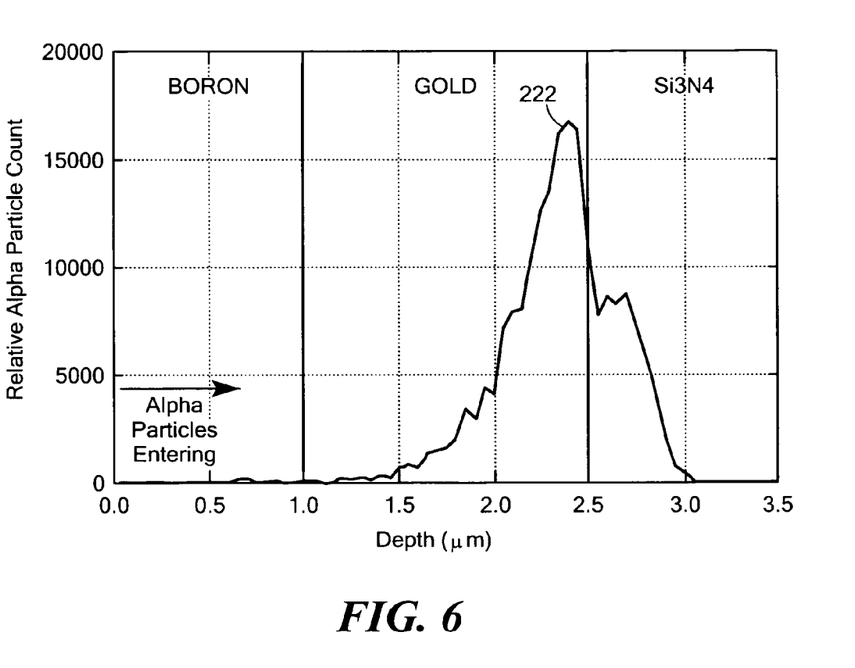
FIG. 6 is a graph showing the final stopping depth of alpha particles in the various layers of the neutron detection system shown in FIGS. 3 and 4.

FIG. 5 shows one example of the spatial distribution for about 5000 ions or energetic particles in neutron sensitive reaction layer 202, energetic particle capturing layer 204 and $VO_x$ layers 116, 118. In this example, the energetic particles, or ions, begin their path at about 1-μm deep in neutron sensitive layer 202, indicated at 270, FIG. 4. This simulates the case of a reaction occurring in the middle of a 2-μm thick neutron sensitive reaction layer 202. The final stopping depths of the energetic particles in this example are shown in FIG. 6. As shown in FIG. 6, the majority of the energetic particles are captured in energetic particle capturing layer 204, indicated at 222.

As shown above, most of the initial slowing of the energetic particles occurs in energetic particle capturing layer 204, FIGS. 3 and 4. The final stopping of all energetic particles is shared between the energetic particle capturing layer 204 and Si₃N₄ layers 118, 120. Nearly all of the ions or energetic particles penetrate neutron sensitive reaction layer 202, as expected because of the 3.53-μm projected range indicated in Table 1 above. The fact that all of the alpha (⁴He) particles stop somewhere within the combined energetic particle capturing layer 204 and Si₃N₄ layers 118, 120 indicates essentially all of their kinetic energy will be captured and converted to heat and detected by readout circuitry 114 to provide an accurate and sensitive detection of neutrons.

The result neutron detector system 200 of this invention provides for accurate and sensitive detection of neutrons. Thus, neutron detector system 200 may be more sensitive to neutrons than conventional neutron detector systems that utilize a Schottky barrier or microchannel plate.

As discussed above, engineering trade-off occurs with respect to the thickness of neutron sensitive reaction layer 202, typically made of ¹⁰B, ⁶Li, or similar type neutron capturing ions. Neutron sensitive reaction layer 202 could be made thicker than 2 μm to improve neutron efficiency. However, any mass added to bridge 104 increases its heat capacity. This reduces the temperature change, ΔT, of bridge 104 caused by the captured energy of the energetic particles of the neutron capture reaction. ΔT is determined by:

$$\Delta T = \Delta E / C_p \quad (2)$$

where ΔE represents the kinetic energy of either of the two of the energetic particles (e.g., ⁷Li or alpha (⁴He). Cp is the heat capacity of the material of bridge 104. The sensitivity of neutron detector system 200 of this invention with microbolometer sensing element 100 and neutron sensitive reaction layer 202 and energetic particle capturing layer 204 is highest when ΔT is maximized because of the change in resistance of VO$_x$ layer 116 is proportional to the temperature excursion. To estimate the reduction in sensitivity due to the addition of neutron sensitive reaction layer 202 and energetic particle capturing layer 204 to bridge 104, the quantities in Table 2 below may be utilized:

TABLE 2

Heat capacities of the materials in the bridge of the sensing element of the neutron detector system.

| Material | | Molar Heat Capacity (joule K⁻¹ mole⁻¹) | Volume Heat Capacity (joule K⁻¹ cm⁻³) |
|---|---|---|---|
| Neutron sensitive reaction layer | B | 12.08 | 2.63 |
| Energetic particle capturing layer | Au | 29.31 | 2.87 |
| VO$_x$ | Si₃N₄ | 100.11 | 2.46 |

The second column in Table 2 provides the molar heat capacity of bridge 104 with neutron sensitive reaction layer 202 made of ¹⁰B, energetic particle capturing layer 204 made of Au, and Si₃N₄ layers 118, 120. See e.g., "*Smithells Metals Reference Book*" Brandes, E. A., Butterworths, 6th edition, chapter 8, London, (1983), incorporated by reference herein. Using the densities of the materials for bridge 104, a heat capacity per unit volume is calculated in the third column of Table 2 above.

Because the volume heat capacities in the third column of Table 2 above are approximately the same, a good estimate of the approximate heat capacity of microbolometer sensing element 100 with neutron sensitive reaction layer 202 and energetic particle capturing layer 204 can be provided based upon the volumes of the materials on bridge 104. In order to estimate the heat capacity, the following parameters may be used: neutron sensitive reaction layer 202 is made of ¹⁰B and has a thickness of about 2 μm, energetic particle capturing layer 204 made of gold and has a thickness 1.5 μm, neutron sensitive reaction layer 202 and energetic particle capturing layer 204 cover about 80% of bridge 104, and a Si3N4 layer 118 has a thickness of about 1 μm and covers 100% of the area of bridge 104. Using these assumptions, the calculated heat capacity is about 3.8 times greater than a conventional microbolometer sensing element 100, FIGS. 1 and 2.

Once the change in heat capacity of microbolometer sensing element 100, FIG. 4, with neutron sensitive reaction layer 202 and energetic particle capturing layer 204 thereon was determined, the sensitivity of microbolometer sensing element 100 with layers 202 and 204 thereon to the deposited energy was investigated. Given the smallest currently available unit cell size of a microbolometer sensing element 100, FIG. 2, which has a pitch of about 17 μm, the temperature response parameter of bridge 104 is about 0.13 nJ/K. This means that 0.13 nJ of energy must be deposited in bridge 104 to raise its temperature by 1° K. When bridge 104, FIG. 4, is modified by adding neutron sensitive reaction layer 202 and energetic particle capturing layer 204, the heat capacity will increase by a factor of about 3.8, as discussed above. Thus, the temperature response parameter now becomes about 0.49 nJ/K. Next, assuming an energetic particle deposits about 1.47 MeV, or 2.35×10⁻¹³ J, of energy in bridge 104, the resulting rise in temperature in bridge 104 is about 480 μK. In comparison, the typical noise in bridge 104, FIG. 2, of conventional microbolometer sensing element 100 is about 200 μK. Thus, a favorable signal-to-noise (SNR) ratio greater than 2 may be achieved by microbolometer sensing element 100 with neutron sensitive reaction layer 202 and energetic particle capturing layer 204 of neutron detector system 200 of this invention.

Additionally, the SNR of neutron detector system 200, FIGS. 3 and 4, may be improved by making legs 106 and 108 thinner to provide a longer thermal time constant. Readout circuit 114, FIG. 3, can be modified to sacrifice some dynamic range for increased sensitivity.

Another advantage of neutron detector system 200 is that it is fairly insensitive to gamma radiation. Using standard gamma ray absorption software, it was found that the energy from a field of gamma rays deposited in neutron sensitive reaction layer 202 and energetic particle capturing layer 204 is very small. Table 3 below shows exemplary fractions of gamma-ray energies absorbed in layers 202 and 204 of system 200.

TABLE 3

Fraction of gamma-ray energy absorbed in the neutron sensitive layer and the energetic particle capturing layer.

| Energy of Gamma-Ray (keV) | Neutron sensitive reaction layer Boron 2 μm Thick | Energetic particle capturing layer Gold 1.5 μm Thick |
|---|---|---|
| 200 | 1.1 × 10⁻⁵ | 1.7 × 10⁻³ |
| 600 | 1.3 × 10⁻⁵ | 1.9 × 10⁻⁴ |
| 1000 | 1.2 × 10⁻⁵ | 1.1 × 10⁻⁴ |

As shown in Table 3, the largest absorption of gamma-rays was about 0.0017 for 200 keV gammas in the 1.5 μm thick energetic particle capturing layer 204 made of gold. The values in Table 3 for the neutron sensitive reaction layer 202 are 10 or 100 times smaller than this. Thus, energetic particle capturing layer 204 made of gold is the dominant gamma absorber for one embodiment of neutron detector system 200.

As discussed above, neutron detector system 200 relates to neutron detection applications where neutrons have a relatively low kinetic energy, e.g., in the range of about 0.01 to 100 eV. Thus, neutron sensitive reaction layer 202 is typically comprised of $^{10}$B or $^{6}$Li and is typically not responsive to high energy neutrons.

However, this is not a necessary limitation of this invention. In another embodiment of this invention, neutron sensitive reaction layer 202 may be made of materials which favor high energy neutrons, e.g., above about 2 MeV. Such a material for neutron sensitive layer 202 needs to: 1) generate highly ionizing secondaries, such as alpha particles or beta rays when neutrons interact with these materials, 2) the induced neutrons capture reactions must have very short half lives, e.g., about 800 ms or less and, 3) needs to have a well established neutron reaction onset energy threshold that falls within the neutron energy range of interest. At least one material which meets all of the aforementioned requirements is a material composed with $^{9}$Be, which has a threshold at about 2 MeV and generates beta rays with a half-life of about 800 ms. The use of $^{9}$Be in neutron sensitive layer 202, instead of $^{10}$B or $^{6}$Li or similar type elements, results in microbolometer sensing element 100 of neutron detector system 200 which is sensitive to high energy neutrons above an energy of about 2 MeV.

Figure 8:
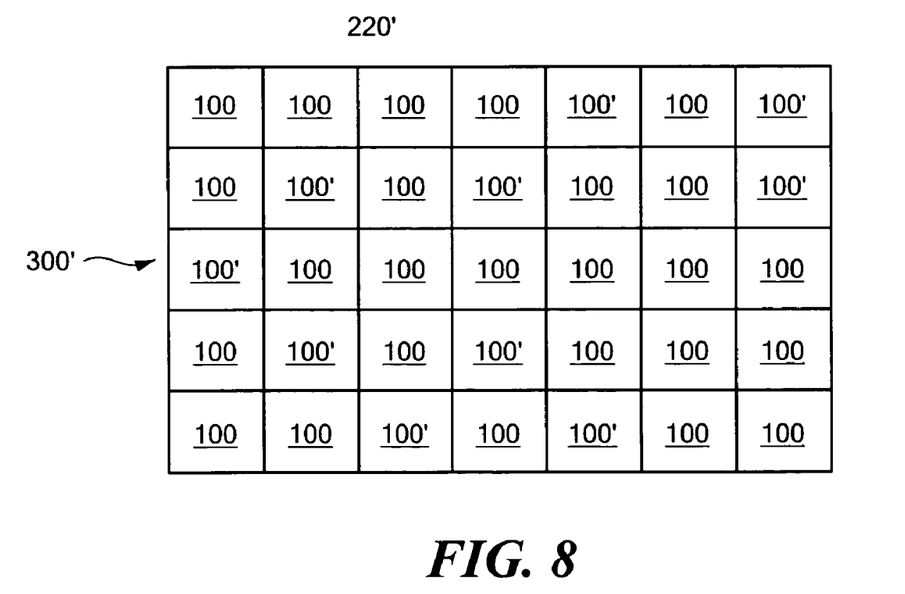
FIG. 8 is a schematic top view of another embodiment of an array of microbolometer sensing elements having the neutron sensitive reaction layer and the energetic particle capturing layer shown in FIGS. 3 and 4

In other embodiment, neutron detector system 200", FIG. 8, may include an array of microbolometer sensing elements, e.g., array 300', wherein some the sensing elements include neutron sensitive reaction layer 202, FIGS. 3 and 4, which is made of $^{10}$B, $^{6}$Li or similar type neutron capturing atoms, and energetic particle capturing layer 204, indicated by microbolometer sensing elements 100, and other microbolometer sensing elements 100' which include neutron sensitive layer 202 made of $^{9}$Be and energetic particle capturing layer 204. Such a design provides neutron detector system 200" with the ability to detect the relative frequency of response of both high and low energy neutrons, e.g., a rough cut of the energy spectrum above and below about 2 MeV.

Note that although specific features of the invention are shown in some drawings and not in others, this is for convenience only as each feature may be combined with any or all of the other features in accordance with the invention. Also, the words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A neutron detector system comprising:
   a neutron sensitive reaction layer configured to react with incident neutrons to form energetic particles;
   an energetic particle capturing layer configured to capture energetic particles emitted from the neutron sensitive reaction layer and convert the kinetic energy of the captured energetic particles to heat; and
   a microbolometer sensing element responsive to the heat configured to detect the incident neutrons.

2. The system of claim 1 in which the neutron sensitive reaction layer includes neutron absorbing atoms.

3. The system of claim 2 in which the neutron absorbing atoms are configured to react with incident neutrons having low energy.

4. The system of claim 2 in which the neutron absorbing atoms include $^{10}$B.

5. The system of claim 2 in which the neutron absorbing atoms include $^{6}$Li.

6. The system of claim 2 in which the neutron absorbing atoms are configured to react with incident neutrons having high energy.

7. The system of claim 6 in which the neutron absorbing atoms include $^{9}$Be.

8. The system of claim 1 in which the energetic particle capturing layer includes a heavy element capable of capturing most of the energetic particles emitted from the neutron sensitive reaction layer.

9. The system of claim 1 in which the microbolometer sensing element includes a bridge supported by legs, said bridge having the neutron sensitive reaction layer and energetic particle capturing layer disposed thereon.

10. The system of claim 9 in which the bridge includes a thin vanadium oxide layer sandwiched between silicon nitride layers.

11. The system of claim 10 in which the combined thickness of the neutron sensitive reaction layer, the energetic particle capturing layer, the thin vanadium oxide layer, and the silicon nitride layers is greater than a projected range of the energetic particles emitted from the neutron sensitive reaction layer.

12. The system of claim 9 in which the heat generated by the energetic particle capturing layer raises the temperature of the bridge which decreases the resistance of the vanadium oxide layer and readout circuitry coupled to the legs measures the change of the resistivity in the vanadium oxide layer to detect the incident neutrons.

13. The system of claim 1 further including an array of microbolometer sensing elements each having the neutron sensitive reaction layer and the energetic particle capturing layer thereon.

14. The system of claim 1 further including an array of microbolometer sensing elements each having the neutron sensitive reaction layer and the energetic particle capturing layer thereon wherein some of the neutron sensitive reaction layers include neutron absorbing atoms for reacting with incident neutrons having low energy and other neutron sensitive reaction layers include neutron absorbing atoms for reacting with incident neutrons having high energy.

15. A method of making a neutron detector system, the method comprising:
   providing a microbolometer sensing element having a bridge supported by legs;
   disposing an energetic particle capturing layer configured to capture energetic particles emitted from the neutron sensitive reaction layer and convert the kinetic energy of the captured energetic particles to heat over the bridge; and
   disposing a neutron sensitive reaction layer over the energetic particle capturing layer.

16. The method of claim 15 further including the step of selecting a material for energetic particle capturing layer which reacts with the incident neutrons to form energetic particles.

17. The method of claim 15 further including the step of selecting a material for the neutron sensitive reaction layer which captures energetic particles emitted from the energetic particle capturing layer and converts the kinetic energy of the captured energetic particles to heat.

18. The method of claim 15 further including the step of making an array of microbolometer sensing elements each having the neutron sensitive reaction layer and the energetic particle capturing layer thereon.

19. The method of claim 15 further including the step of making an array of microbolometer sensing elements each having the neutron sensitive reaction layer and the energetic particle capturing layer thereon wherein some of the neutron sensitive reaction layers are selected to include neutron absorbing atoms for reacting with incident neutrons having low energy and other neutron sensitive reaction layers are selected to include neutron absorbing atoms for reacting with incident neutrons having high energy.

20. A method for detecting neutrons comprising:
reacting incident neutrons with a neutron sensitive reaction layer to form energetic particles;
capturing energetic particles emitted from the neutron sensitive reaction layer and converting the kinetic energy of the captured energetic particles to heat; and
detecting the incident neutrons using said heat.

* * * * *